(12) United States Patent
Matsushita

(10) Patent No.: US 8,794,719 B2
(45) Date of Patent: Aug. 5, 2014

(54) BRAKE DEVICE FOR VEHICLE

(75) Inventor: Satoshi Matsushita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 92 days.

(21) Appl. No.: 13/258,525

(22) PCT Filed: Mar. 17, 2010

(86) PCT No.: PCT/JP2010/054569
§ 371 (c)(1),
(2), (4) Date: Sep. 22, 2011

(87) PCT Pub. No.: WO2010/116873
PCT Pub. Date: Oct. 14, 2010

(65) Prior Publication Data
US 2012/0007417 A1    Jan. 12, 2012

(30) Foreign Application Priority Data
Apr. 8, 2009    (JP) .................................. 2009-093575

(51) Int. Cl.
*B60T 8/88*     (2006.01)
*B60T 8/64*     (2006.01)

(52) U.S. Cl.
USPC ..................................... 303/122.09; 303/152

(58) Field of Classification Search
USPC .......................... 303/3, 122–122.14, 151–152
See application file for complete search history.

(56) References Cited

U.S. PATENT DOCUMENTS

| 5,857,755 A | 1/1999 | Aoki et al. |
| 7,136,737 B2 | 11/2006 | Ashizawa et al. |
| 2005/0269875 A1 | 12/2005 | Maki et al. |
| 2007/0228821 A1 * | 10/2007 | Maki et al. ..................... 303/151 |

FOREIGN PATENT DOCUMENTS

| CN | 1706700 A | 12/2005 |
| DE | 10 2004 027 256 A1 | 1/2005 |
| JP | 6-153316 A | 5/1994 |
| JP | 8-026098 A | 1/1996 |
| JP | 2000-225932 A | 8/2000 |
| JP | 2001-211502 A | 8/2001 |
| JP | 2004-196064 A | 7/2004 |
| JP | 2005-329740 A | 12/2005 |
| JP | 2006-232117 A | 9/2006 |
| JP | 2006-312384 A | 11/2006 |
| JP | 2008-110633 A | 5/2008 |

* cited by examiner

*Primary Examiner* — Vishal Sahni

(74) *Attorney, Agent, or Firm* — Carrier Blackman & Associates, P.C.; Joseph P. Carrier; Michael J. McCandlish

(57) ABSTRACT

At a time (t3) when a vehicle speed is decreased below a switching-start vehicle speed and the switching from regenerative braking to fluid pressure braking is performed, even if a slave cylinder is caused to be operated by driving an electric motor at the same time of starting the reduction of regenerative braking force, the increase of fluid pressure braking force is delayed by an ineffective stroke in the slave cylinder. Accordingly, a temporary drop of total braking force of the regenerative braking force and fluid pressure braking force is generated. However, at a time (t2) when a vehicle speed is decreased below a switching-preparation-start vehicle speed, the electric motor is, beforehand, caused to drive slightly to cancel out the ineffective stroke in the slave cylinder. This can prevent a temporary drop of the total braking force of the regenerative braking force and fluid pressure braking force at the time of the switching, and can thereby prevent deterioration of brake feeling.

14 Claims, 6 Drawing Sheets

UNDER NORMAL CONDITION

UNDER ABNORMAL CONDITION

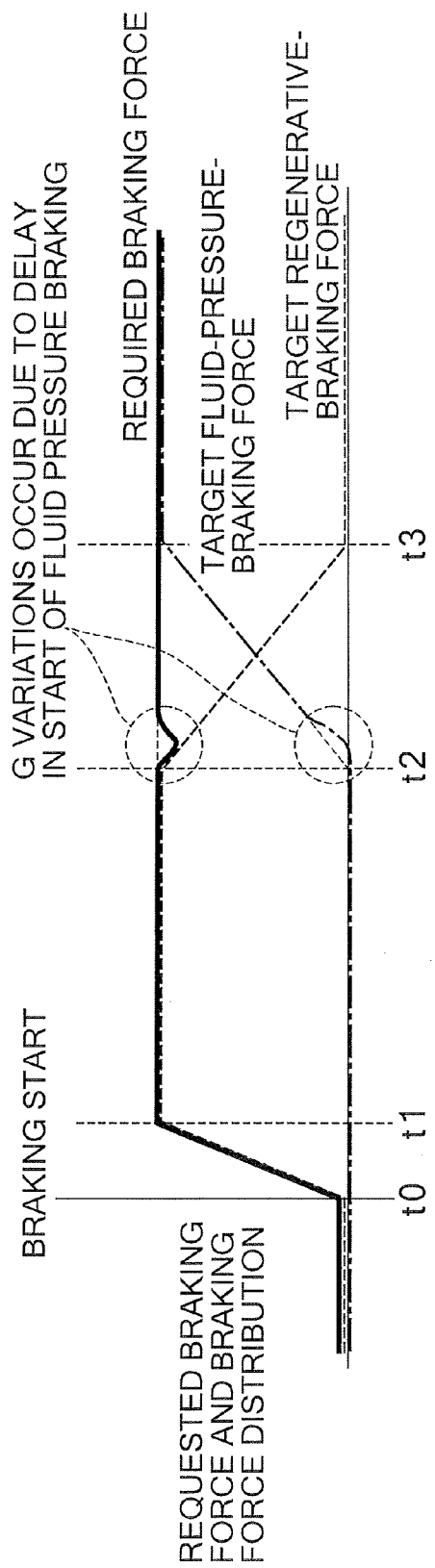

BRAKE DEVICE FOR VEHICLE

TECHNICAL FIELD

The present invention relates to a brake device for a vehicle capable of regenerative braking and fluid pressure braking, including an electric brake-fluid-pressure generator for generating a brake fluid pressure for the fluid pressure braking.

BACKGROUND ART

The following BBW (brake by wire) type brake device is known by Patent Document 1 given below. In the BBW type brake device, an operation of a brake pedal by a driver is converted to an electric signal, and wheel cylinders are operated by a brake fluid pressure generated by a slave cylinder which operates according to the electric signal. A master cylinder that is operated by the brake pedal is provided as a backup for the case in which the slave cylinder fails to operate. While the slave cylinder is operating normally, the brake pedal is allowed to stroke by a stroke simulator absorbing brake fluid delivered by the master cylinder.

Patent Document 1: Japanese Patent Application Laid-open No. 2008-110633

DISCLOSURE OF INVENTION

Problems to be Solved by the Invention

Incidentally, in the case of hybrid vehicles and electric automobiles including a motor generator as a drive source for traveling, the kinetic energy of a vehicle body is collected as electric energy by regenerative braking of the motor generator. To collect the kinetic energy of the vehicle body efficiently, the regenerative braking needs to be given priority over fluid pressure braking. Regenerative braking is stopped and switched to fluid pressure braking in such a case where a required braking force cannot be produced only by the regenerative braking, a battery may be overcharged, and the regeneration efficiency of the motor generator is decreased due to a decrease in the speed of the vehicle.

FIG. 6 is a time chart showing a process of switching from regenerative braking to fluid pressure braking. Considered is a case in which a required braking force, shown by a solid line, starts to rise from 0 at Time t0 and keeps a constant value after Time t1. At an initial stage of the braking, the whole of the required braking force is covered by the regenerative braking force. When the vehicle speed falls below a switching-start vehicle speed at Time t2, for example, the regenerative braking force is decreased from a predetermined value to 0 while the fluid pressure braking force is caused to rise from 0, so as to switch from the regenerative braking to fluid pressure braking. Thereby, at Time t3, the regenerative braking force reaches 0 while the fluid pressure braking force reaches the predetermined value.

In the BBW type brake device, a brake fluid pressure is generated for fluid pressure braking by the slave cylinder operated by an electric motor. However, even when the electric motor for the slave cylinder is started, there is a time lag until a piston starts to move in the cylinder, due to a backlash of a drive force transmission system and the like. Moreover, even when the piston has started to move in the cylinder, there is a time lag until a brake fluid pressure starts to be generated, due to deformation of cup seals provide to the piston. Because of those, the fluid pressure braking force may not start to increase smoothly at Time t2, possibly causing a temporary drop of the total braking force below a target braking force immediately after Time t2. This may deteriorate brake feeling.

The present invention has been made in view of the above-described circumstances, and an object thereof is to prevent, in switching from regenerative braking to fluid pressure braking, a temporary drop of a total braking force caused by an ineffective stroke in fluid pressure braking along with an operation of an electric brake-fluid-pressure generator.

Means for Solving the Problems

In order to attain the above object, according to a first aspect of the present invention, there is proposed a brake device for a vehicle capable of regenerative braking and fluid pressure braking, including an electric brake-fluid-pressure generator for generating a brake fluid pressure for the fluid pressure braking, characterized in that the electric brake-fluid-pressure generator is caused to operate to cancel out an ineffective stroke in the fluid pressure braking before switching from the regenerative braking to the fluid pressure braking.

Furthermore, according to a second aspect of the present invention, in addition to the first aspect, there is proposed the brake device for a vehicle, wherein the ineffective stroke is cancelled out when it is detected that the regenerative braking is being performed.

Moreover, according to a third aspect of the present invention, in addition to the first aspect, there is proposed the brake device for a vehicle, wherein the ineffective stroke is cancelled out when it is detected that a vehicle speed is decreased below a predetermined value while the regenerative braking is being performed.

Furthermore, according to a fourth aspect of the present invention, in addition to any one of the first to third aspects, there is proposed the brake device for a vehicle, wherein the electric brake-fluid-pressure generator cancels out the ineffective stroke by supplying a constant current to an electric motor.

Moreover, according to a fifth aspect of the present invention, in addition to any one of the first to third aspects, there is proposed the brake device for a vehicle, wherein the electric brake-fluid-pressure generator cancels out the ineffective stroke by gradually increasing a current supplied to an electric motor until an operation amount of the electric motor reaches a predetermined value.

Furthermore, according to a sixth aspect of the present invention, in addition to the fourth or fifth aspect, there is proposed the brake device for a vehicle, wherein the electric brake-fluid-pressure generator determines an operation amount of the electric motor necessary to cancel out the ineffective stroke, on the basis of variation of a brake fluid pressure in association with an operation of the electric motor.

Here, a slave cylinder 23 of an embodiment corresponds to the electric brake-fluid-pressure generator of the present invention.

Effects of the Invention

In switching from regenerative braking to fluid pressure braking, start of the fluid pressure braking is delayed by an ineffective stroke in the fluid pressure braking even if the electric brake-fluid-pressure generator is caused to operate at the same time as the end of the regenerative braking, causing a temporary drop of a braking force. However, according to the first aspect of the present invention, the electric brake-fluid-pressure generator is caused to drive before the switching from regenerative braking to fluid pressure braking, to cancel out an ineffective stroke. This can prevent a temporary drop of a braking force at the time of the switching, and can thereby prevent deterioration of brake feeling.

Moreover, according to the second aspect of the present invention, when it is detected that regenerative braking is being performed, the electric brake-fluid-pressure generator is driven to cancel out an ineffective stroke. Hence, an ineffective stroke is reliably cancelled out before the switching from regenerative braking to fluid pressure braking.

Moreover, according to the third aspect of the present invention, when it is detected that a vehicle speed is decreased below a predetermined value while regenerative braking is being performed, the electric brake-fluid-pressure generator is driven to cancel out an ineffective stroke. Accordingly, unnecessary drive of the electric brake-fluid-pressure generator during regenerative braking can be kept to the minimum.

Moreover, according to the fourth aspect of the present invention, the electric brake-fluid-pressure generator cancels out the ineffective stroke by supplying a constant current to the electric motor of the electric brake-fluid-pressure generator. Thereby, a predetermined driving force corresponding to a load occurring to drive the electric brake-fluid-pressure generator can be generated in the electric motor without fail.

Moreover, according to the fifth aspect of the present invention, the ineffective stroke is cancelled out by gradually increasing a current supplied to the electric motor of the electric brake-fluid-pressure generator until the operation amount of the electric motor reaches a predetermined value. This can prevent a drastic operation of the electric motor and a noise generated by such an operation, and can also reduce influences of variations in voltage from power supply, temperature changes, aged deterioration of the electric motor and the like.

Moreover, according to the sixth aspect of the present invention, the operation amount of the electric motor of the electric brake-fluid-pressure generator necessary to cancel out the ineffective stroke is determined, on the basis of variation of the brake fluid pressure in association with the operation of the electric motor. Accordingly, the electric motor is operated exactly as needed, which reliably cancels out an ineffective stroke from occurring.

BRIEF DESCRIPTION OF DRAWINGS

FIG. 6 is a time chart explaining operations at the time of switching from regenerative braking to fluid pressure braking. (conventional example)

EXPLANATION OF REFERENCE NUMERALS AND SYMBOLS

Figure 1:
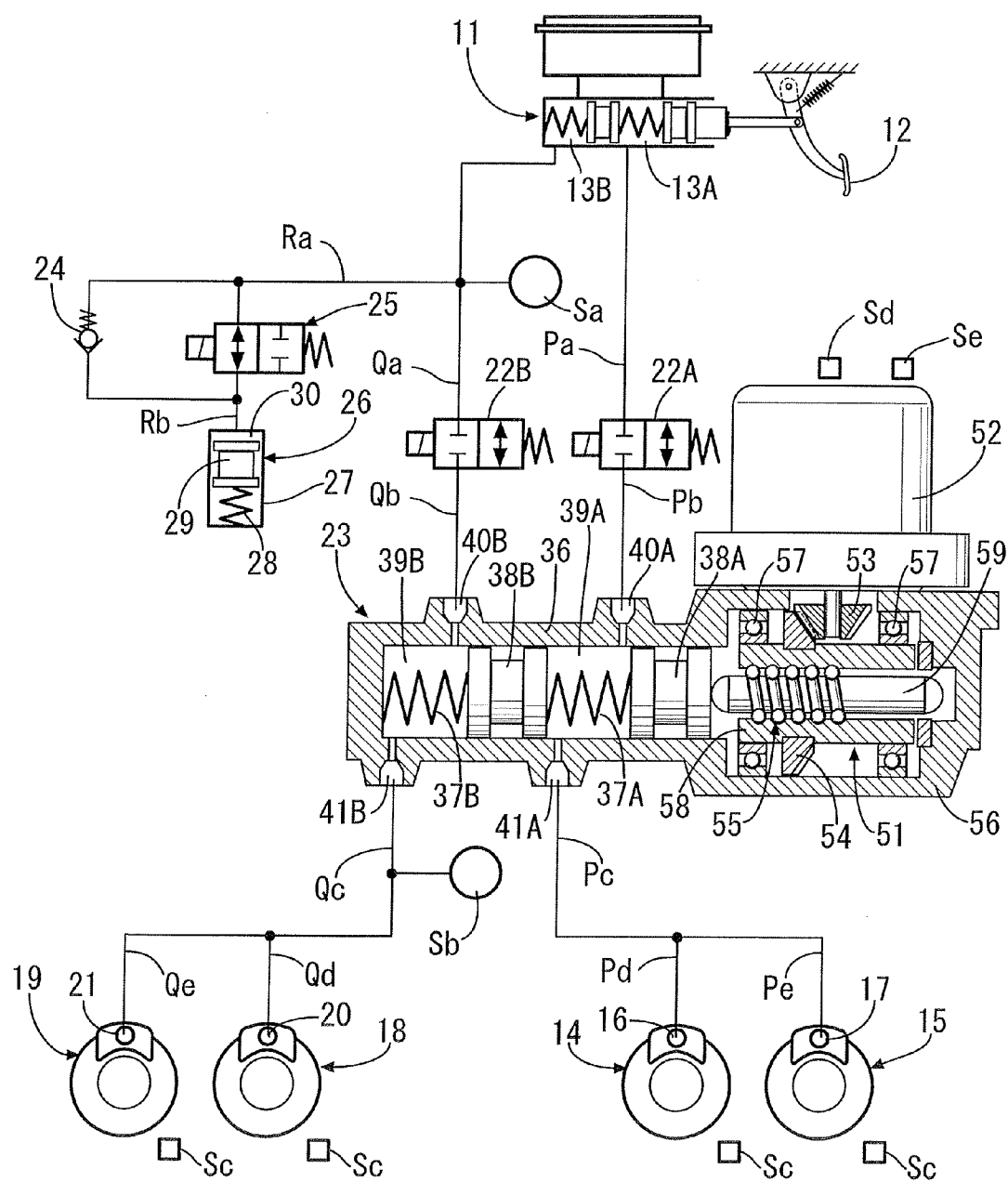
FIG. 1 is a diagram of a fluid pressure circuit of a brake device for a vehicle under a normal condition. (first embodiment)

12 Brake pedal
16 Wheel cylinder
17 Wheel cylinder
20 Wheel cylinder
21 Wheel cylinder
23 Slave cylinder (electric brake-fluid-pressure generator)
52 Electric motor

BEST MODES FOR CARRYING OUT THE INVENTION

A first embodiment of the present invention is explained below based on FIG. 1 to FIG. 3.

First Embodiment

As shown in FIG. 1, a tandem-type master cylinder 11 includes a secondary fluid pressure chamber 13A and a primary fluid pressure chamber 13B for outputting a brake fluid pressure corresponding to a tread force applied to a brake pedal 12 by a driver. The secondary fluid pressure chamber 13A is connected to wheel cylinders 16 and 17 of disk brake devices 14 and 15 for a left front wheel and a right rear wheel, for example, through fluid paths Pa, Pb, Pc, Pd and Pe, and the primary fluid pressure chamber 13B is connected to wheel cylinders 20 and 21 of disk brake devices 18 and 19 for a right front wheel and a left rear wheel, for example, through fluid paths Qa, Qb, Qc, Qd and Qe.

An on-off valve 22A, which is a normally open electromagnetic valve, is disposed between the fluid paths Pa and Pb while an on-off valve 22B, which is a normally open electromagnetic valve, is disposed between the fluid paths Qa and Qb, and a slave cylinder 23 is disposed between the fluid paths Pb and Qb and the fluid paths Pc and Qc. Moreover, a stroke simulator 26 is connected to fluid paths Ra and Rb branching from the fluid path Qa leading out of the primary fluid pressure chamber 13B, through a reaction force allowing valve 25, which is a normally closed electromagnetic valve. The stroke simulator 26 is formed by slidably fitting, to a cylinder 27, a piston 29 biased by a simulator spring 28, and a fluid pressure chamber 30 formed on the opposite side of the piston 29 from the simulator spring 28 communicates with the fluid path Rb. A check valve 24 is connected so as to allow brake fluid to flow only from the stroke simulator 26 side to the master cylinder 11 side while bypassing the reaction force allowing valve 25.

An actuator 51 of the slave cylinder 23 includes: a drive bevel gear 53 provided to a rotation shaft of an electric motor 52; a follower bevel gear 54 meshed with the drive bevel gear 53; and a ball screw mechanism 55 operated by the follower bevel gear 54. A sleeve 58 is rotatably supported at an actuator housing 56 by a pair of ball bearings 57 and 57, and an output shaft 59 is disposed coaxially on an inner periphery of the sleeve 58 while the follower bevel gear 54 is fixed to an outer periphery of the sleeve 58.

A secondary piston 38A and a primary piston 38B biased in a rearward direction by a pair of return springs 37A and 37B are slidably disposed in a cylinder main body 36 of the slave cylinder 23, and a secondary fluid pressure chamber 39A is defined in front of the secondary piston 38A and a primary fluid pressure chamber 39B is defined in front of the primary piston 38B. A front end of the output shaft 59 is in contact with a rear end of the secondary piston 38A. The secondary fluid pressure chamber 39A communicates with the fluid paths Pb and Pc through ports 40A and 41A, respectively, and the primary fluid pressure chamber 39B communicates with the fluid paths Qb and Qc through ports 40B and 41B, respectively.

A fluid pressure sensor Sa for detecting a brake fluid pressure generated by the primary fluid pressure chamber 13B of the master cylinder 11 is provided to the fluid path Qa, and a fluid pressure sensor Sb for detecting a brake fluid pressure generated by the primary fluid pressure chamber 39B of the slave cylinder 23 is provided to the fluid path Qc. In addition, vehicle speed sensors Sc••• for detecting a vehicle speed on the basis of the average value of outputs therefrom are provided to the wheels, respectively. Further, a current sensor Sd for detecting a current of the electric motor 52 and a rotation angle sensor Se for detecting a rotation angle of the electric motor 52 are provided to the electric motor 52 of the slave cylinder 23. An unillustrated electronic control unit to which signals from the fluid pressure sensors Sa and Sb, the vehicle speed sensors Sc•••, the current sensor Sd and the rotation angle sensor Se are inputted controls operations of the on-off valves 22A and 22B, the reaction force allowing valve 25, the slave cylinder 23 and a motor generator, which is described later.

This embodiment is intended for a hybrid vehicle or an electric automobile, and can provide regenerative braking for the driving wheels when the driving wheels are connected to the motor generator as well as fluid pressure braking for the four wheels using a brake fluid pressure generated by the slave cylinder 23. The electronic control unit provides coordination control of both the regenerative braking by the motor generator and the fluid pressure braking by the slave cylinder 23. The electronic control unit distributes a brake fluid pressure detected by the fluid pressure sensor Sa (i.e. a required braking force according to the driver) to a regenerative braking force and a fluid pressure braking force, and controls the regenerative braking force of the motor generator and the fluid pressure braking force of the slave cylinder 23 according to the distribution.

Next, descriptions will be given of operation of the fluid pressure braking by the slave cylinder 23.

In a normal state where the system operates normally, the on-off valves 22A and 22B, which are normally open electromagnetic valves, are closed by being excited, and the reaction force allowing valve 25, which is a normally closed electromagnetic valve, is opened by being excited. Upon receipt of an instruction of fluid pressure braking by the electronic control unit in this state, the actuator 51 of the slave cylinder 23 starts to operate. Specifically, when the electric motor 52 is driven in one direction, the output shaft 59 moves forward by the action of the drive bevel gear 53, the follower bevel gear 54 and the ball screw mechanism 55, and thereby the secondary piston 38A and the primary piston 38B pushed by the output shaft 59 move forward. Since the on-off valves 22A and 22B are closed, a brake fluid pressure is generated in the secondary fluid pressure chamber 39A and the primary fluid pressure chamber 39B immediately after the two pistons 38A and 38B start to move forward. The brake fluid pressures are transmitted to the wheel cylinders 16 and 17; 20 and 21 of the disk brake devices 14 and 15; 18 and 19, to brake the wheels.

At this time, a brake fluid pressure generated by the primary fluid pressure chamber 13B of the master cylinder 11 is transmitted to the fluid pressure chamber 30 of the stroke simulator 26 through the reaction force allowing valve 25 which is opened, thereby moving the piston 29 against the simulator spring 28. This allows the brake pedal 12 to stroke, and can also resolve discomfort of the driver by generating a pseudo pedal reaction force.

In addition, the operation of the actuator 51 of the slave cylinder 23 is controlled so that the brake fluid pressure by the slave cylinder 23 detected by the fluid pressure sensor Sb provided to the fluid path Qc would correspond to a fluid pressure braking force specified by an instruction by the electronic control unit. In this way, certain braking forces can be generated for the disk brake devices 14 and 15; 18 and 19.

In this embodiment, regenerative braking is given priority over fluid pressure braking. For this reason, when the regeneration efficiency of the motor generator decreases due to a decrease in the vehicle speed below a predetermined value, the regenerative braking is switched to fluid pressure braking.

Figure 3:
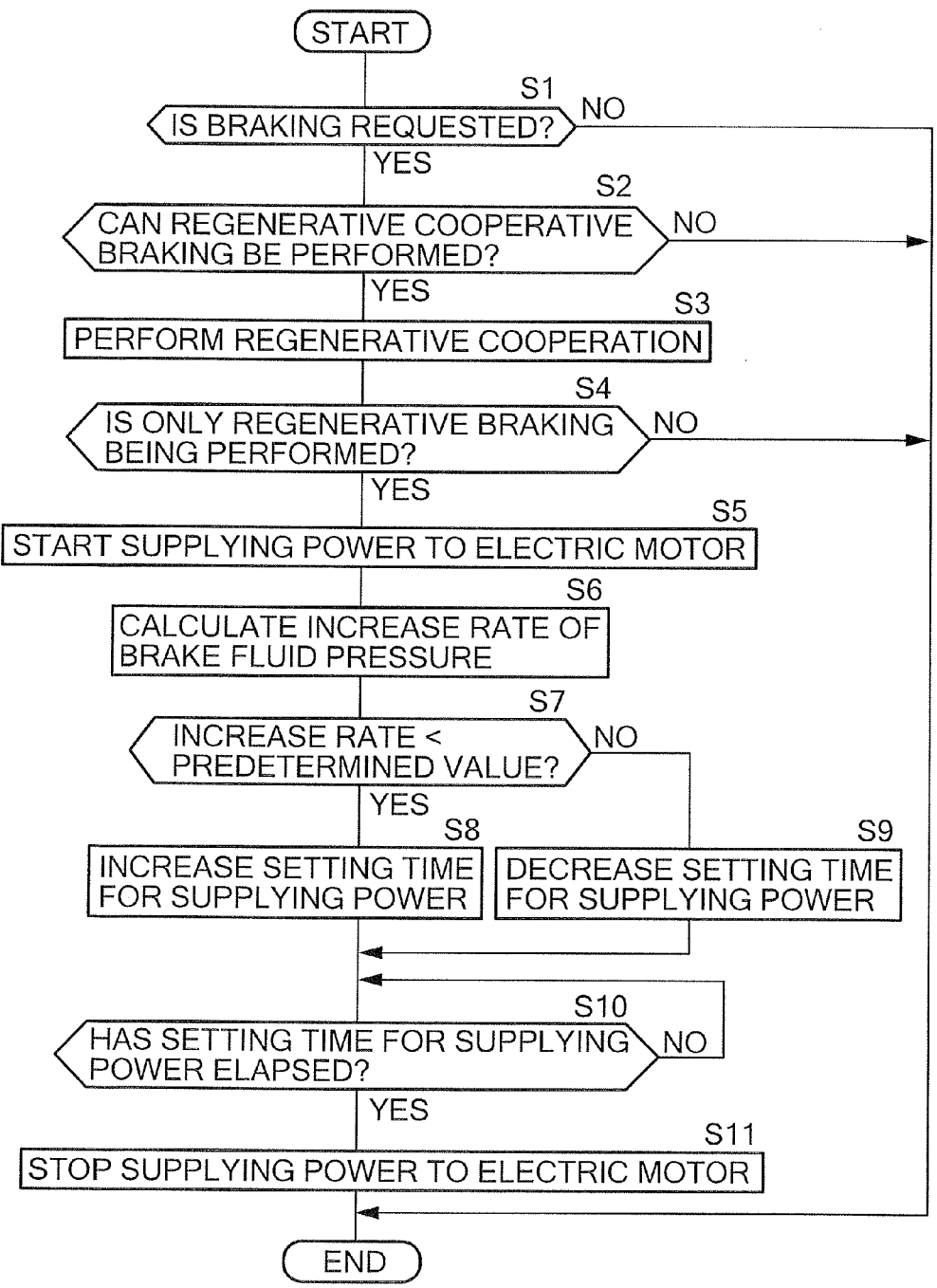
FIG. 3 is a flowchart explaining operations at the time of switching from regenerative braking to fluid pressure braking. (first embodiment)

Specifically, as shown in a flowchart in FIG. 3, first, when the driver depresses the brake pedal 12 to output a braking request in Step S1, it is judged in Step S2 whether or not regenerative coordination control can be performed. Specifically, when the battery is not fully charged, regenerative braking by the motor generator is possible, and the slave cylinder 23 can operate normally, it is judged in Step S2 that regenerative cooperative control can be performed, and then regenerative cooperative control is performed in Step S3.

In an initial stage of the regenerative coordination control, only regenerative braking is performed as described above so as to efficiently collect the kinetic energy of the vehicle body. Accordingly, the slave cylinder 23 is kept in a non-operating state and hence does not generate any brake fluid pressure. Then, if it is judged in Step S4 that only regenerative braking is being performed, preparation is made in Step S5 to Step S11 for the time when the regenerative braking is to be switched to fluid pressure braking due to a decrease of the vehicle speed detected by the vehicle speed sensors Sc••• below a switching-start vehicle speed.

Specifically, on the basis of an instruction from the electronic control unit, the electric motor 52 of the slave cylinder 23 is driven slightly, to move the secondary piston 38A and the primary piston 38B by the amount of an ineffective stroke in advance. An ineffective stroke is a stroke generating no effective brake fluid pressure in the secondary fluid pressure chamber 39A and the primary fluid pressure chamber 39B even when the secondary piston 38A and the primary piston 38B are caused to stroke by driving the electric motor 52 of the slave cylinder 23, due to deformation of cup seals of the slave cylinder 23, deformation of cup seals of the wheel cylinders 16 and 17; 20 and 21, swelling in brake piping caused by the brake fluid pressure, or the like. While a small and measurable change in brake fluid pressure is generated by the secondary piston 38A and the primary piston 38B due to this stroke, the brake fluid pressure remains at a level below a level required to initiate brake fluid braking.

To be more precise, first, a certain current is supplied to the electric motor 52 according to an instruction from the electronic control unit in Step S5, and the electronic control unit is provided with a feedback of a current detected by the current sensor Sd in return. By driving the electric motor 52 with a constant current in this way, a driving force corresponding to a load occurring to drive the slave cylinder 23 can be generated in the electric motor 52 without fail.

Subsequently, in Step S6, an increase rate of the brake fluid pressure (an increase amount of the brake fluid pressure per unit time) detected by the fluid pressure sensor Sb at the time of starting to supply power to the electric motor 52 is calculated. If it is judged in Step S7 that the increase rate of the brake fluid pressure is below a predetermined value, a setting time for supplying power to the electric motor 52 is increased in Step S8. If it is judged that the increase rate of the brake fluid pressure is equal to or above the predetermined value, on the other hand, the setting time for supplying the power to the electric motor 52 is decreased in Step S9, and, when the setting time for power supply has elapsed in Step S10, the power supply to the electric motor 52 is stopped in Step S11.

In this way, the electric motor 52 is operated exactly as needed, which reliably cancels out an ineffective stroke from occurring.

In another method of controlling the electric motor 52, a current supplied to the electric motor 52 may be gradually increased until the rotation angle of the electric motor 52 detected by the rotation angle sensor Se reaches a rotation angle corresponding to an ineffective stroke. Employing this method can prevent a drastic operation of the electric motor 52 and a noise generated by such an operation, and can also reduce influences of variations in voltage from power supply, temperature changes, aged deterioration of the electric motor 52 and the like. Further, the electric motor 52 is operated exactly as needed, which reliably prevents an ineffective stroke from occurring.

As a result, the slave cylinder 23 can generate a brake fluid pressure immediately after being caused to operate to switch from the regenerative braking to fluid pressure braking due to a decrease of the vehicle speed below the switching-start vehicle speed. This prevents the drop of the brake fluid pressure described with reference to FIG. 6, and keeps the sum of the regenerative braking force and the fluid pressure braking force to be precisely equal to the required braking force, which prevents deterioration of brake feeling due to a drop of braking force.

Meanwhile, when the slave cylinder 23 becomes inoperable because of loss of power or the like, braking is performed by using a brake fluid pressure generated by the master cylinder 11, instead of the brake fluid pressure generated by the slave cylinder 23. In this case, the regenerative braking by the motor generator is stopped, and the whole of the braking force is covered by the braking fluid pressure generated by the master cylinder 11.

Figure 2:
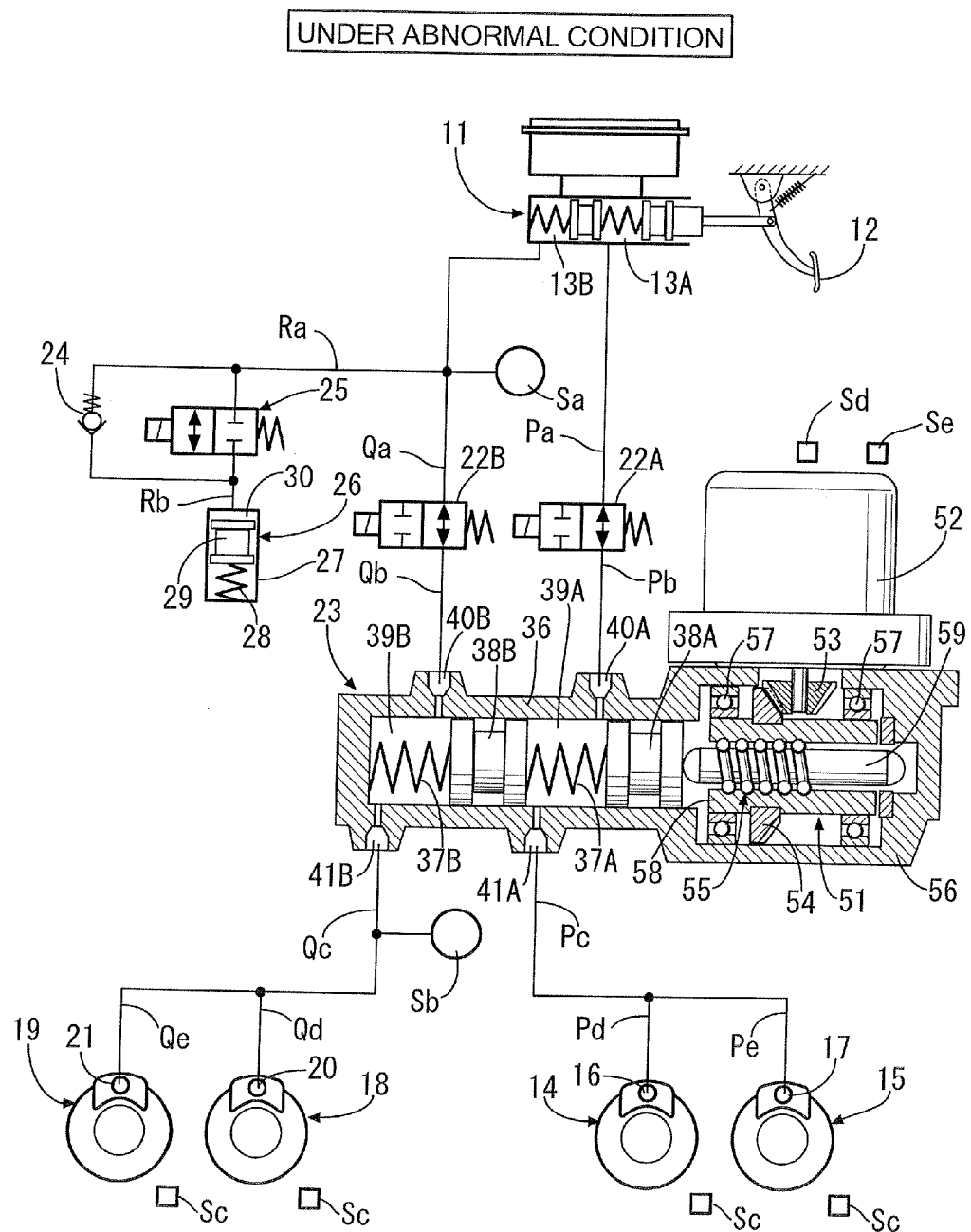
FIG. 2 is a diagram of a fluid pressure circuit of the brake device for a vehicle under an abnormal condition. (first embodiment)

Specifically, when the power is lost, the on-off valve 22A and 22B, which are normally open electromagnetic valves, are automatically opened, and the reaction force allowing valve 25, which is a normally closed electromagnetic valve, is automatically closed, as shown in FIG. 2. In this state, brake fluid pressures generated in the secondary fluid pressure chamber 13A and the primary fluid pressure chamber 13B of the master cylinder cause the wheel cylinders 16 and 17; 20 and 21 of the disk brake devices 14 and 15; 18 and 19 for the respective wheels to operate, by passing the secondary fluid pressure chamber 39A and the primary fluid pressure chamber 39B of the slave cylinder 23 without being absorbed by the stroke simulator 26, thereby generating a braking force without any problem.

If the power is lost in the state where a brake fluid let out from the secondary fluid pressure chamber 13A of the master cylinder 11 when the driver depresses the brake pedal 12 is absorbed by the stroke simulator 26, the reaction force allowing valve 25, which is a normally closed electromagnetic valve, is automatically closed, and thereby the brake fluid is trapped in the fluid pressure chamber 30 of the stroke simulator 26. The brake fluid thus trapped is sent back to the master cylinder 11 side through the check valve 24, thus preventing shift in position of the brake pedal 12 because of a lack of the brake fluid.

Next, a second embodiment of the present invention will be described below based on FIG. 4 and FIG. 5.

Second Embodiment

In the first embodiment, every time regenerative braking is performed, the slave cylinder 23 is driven to cancel out an ineffective stroke. However, if the driver lets the brake pedal 12 off before the vehicle speed decreases below the switching-start vehicle speed, fluid pressure braking by the slave cylinder 23 ends up with not being performed. In this case, the drive of the slave cylinder 23 canceling out an ineffective stroke may be in vain.

Figure 4:
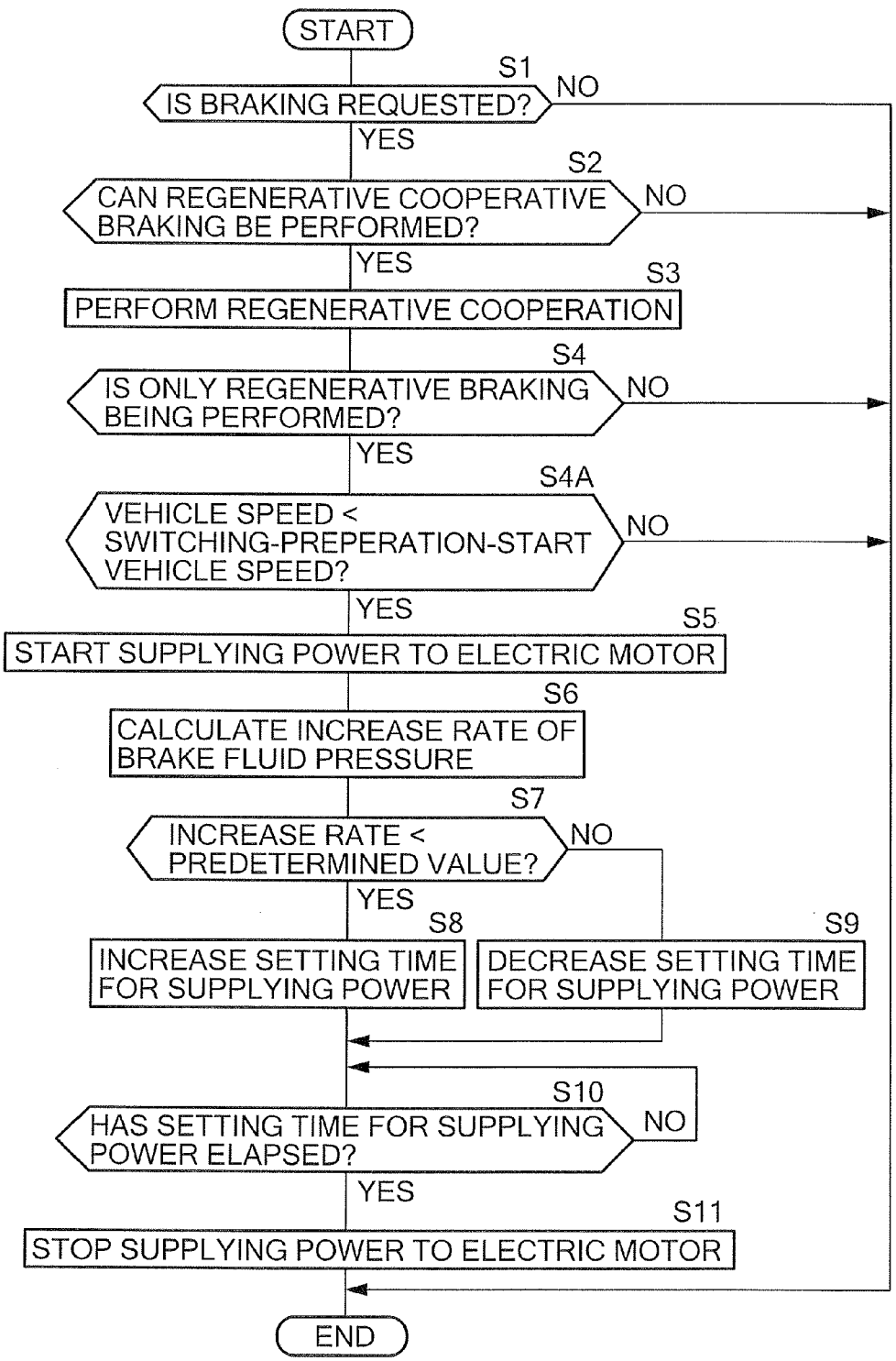
FIG. 4 is a flowchart explaining operations at the time of switching from regenerative braking to fluid pressure braking. (second embodiment)
Figure 5:
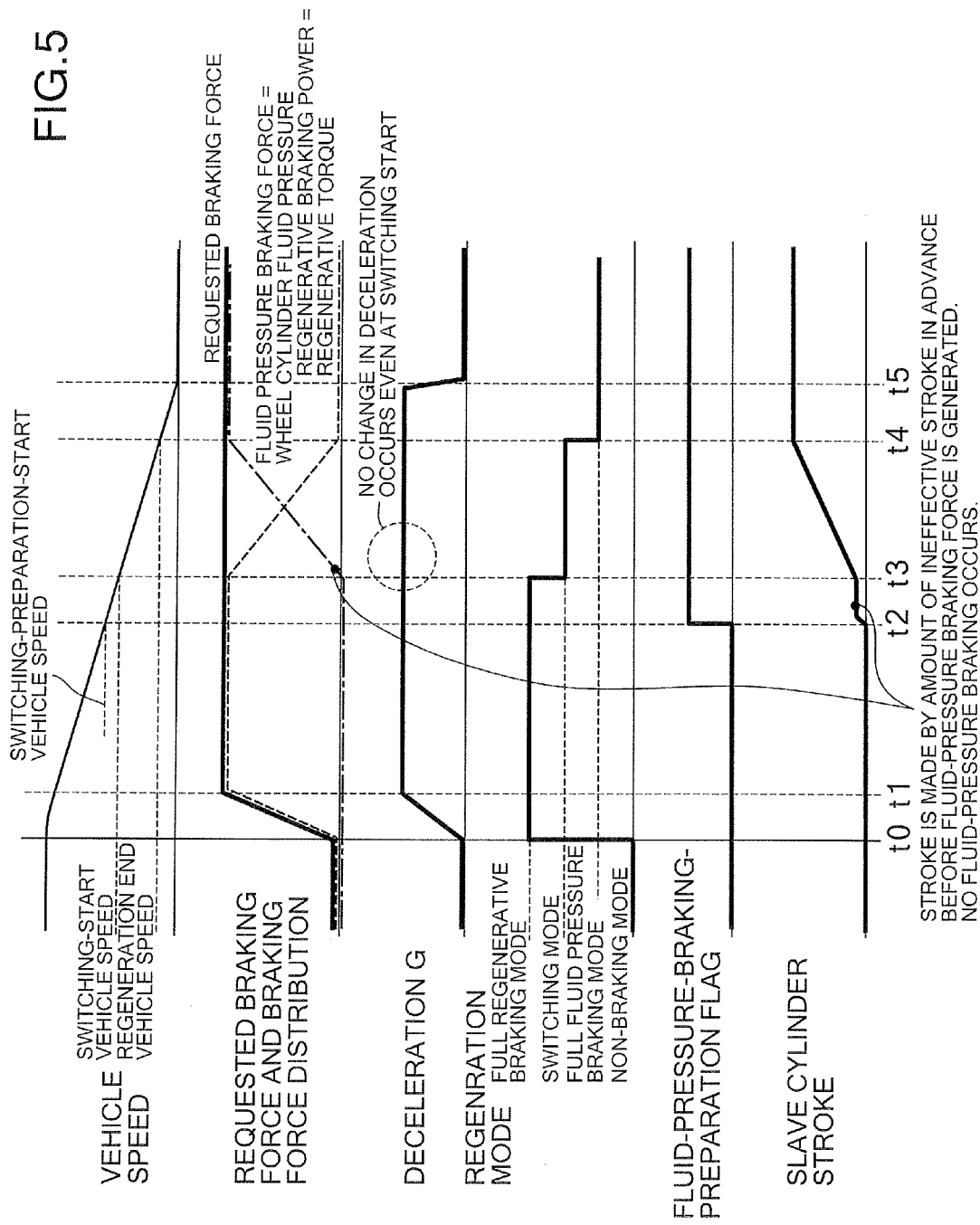
FIG. 5 is a time chart explaining operations at the time of switching from regenerative braking to fluid pressure braking. (second embodiment)

A flowchart of the second embodiment shown in FIG. 4 is a solution of the above-described problem, and Step S4A is added to a position after Step S4 in the flowchart in FIG. 3 showing the control according to the first embodiment. Specifically, when it is judged in Step S4 that only the regenerative braking is being performed, and it is judged that the vehicle speed detected by the vehicle speed sensors Sc••• is below a switching-preparation-start vehicle speed, which is slightly higher than the above-described switching-start vehicle speed, preparation is made in Step S5 to Step S11 by driving the slave cylinder 23 to cancel out an ineffective stroke, for the time when the regenerative braking is to be switched to fluid pressure braking due to a decrease of the vehicle speed below the switching-start vehicle speed.

According to this embodiment, even when regenerative braking is being performed, the slave cylinder 23 is not driven to cancel out an ineffective stroke, until the vehicle speed is decreased below the switching-preparation-start vehicle speed, which is slightly higher than the switching-start vehicle speed. Accordingly, it is possible to prevent, if the driver lets the brake pedal 12 off, the slave cylinder 23 from being driven unnecessarily so as to cancel out an ineffective stroke.

This operation will be further described with reference to a time chart in FIG. 5.

When the driver depresses the brake pedal 12 at Time t0, a full regenerative braking mode starts. A required braking force increases from 0 to a predetermined value until Time t1, and then regenerative braking starts, thereby increasing also deceleration from 0 to a predetermined value. When the vehicle speed is decreased below the switching-preparation-start vehicle speed at Time t2, a fluid-pressure-braking-preparation flag is set, and the slave cylinder 23 is operated slightly so as to cancel out an ineffective stroke. Then, when the vehicle speed is decreased below the switching-start vehicle speed at Time t3, the full regenerative braking mode is switched to a switching mode. Then, the regenerative braking force is decreased toward 0 until Time t4, and at the same time, the slave cylinder 23 starts to operate to increase a fluid pressure braking force from 0 to a predetermined value.

In this operation, since the slave cylinder 23 operates in advance at Time t2 to cancel out an ineffective stroke, the brake fluid pressure increases immediately after the slave cylinder 23 starts to operate officially at Time t3, which can make the total braking force of the regenerative braking force and the fluid braking force equal to the required braking force. Accordingly, a drop of the braking force during switching can be prevented, and hence brake feeling can be enhanced.

When the vehicle speed is decreased below a regeneration-end vehicle speed at Time t4, the switching mode is switched to a full fluid pressure braking mode. In this mode, the brake fluid pressure generated by the slave cylinder 23 is kept at a constant value, the regenerative braking is terminated, and the whole of the required braking force is provided by the fluid pressure braking. When the vehicle speed is decreased to 0 at Time t5, the full fluid pressure braking mode is switched to a non-braking mode, and the deceleration of the vehicle body is decreased to 0.

Embodiments of the present invention have been described above, but various design modifications can be made to the present invention without departing from the gist thereof.

For example, in the embodiments, the slave cylinder 23 is provided as an example of an electric brake-fluid-pressure generator. However, the electric brake-fluid-pressure generator can have any configuration as long as being for generating a brake fluid pressure electrically.

Moreover, in the embodiments, the wheel cylinders 16 and 17; 20 and 21 are directly connected to the slave cylinder 23. However, a VSA (vehicle stability assist) system or an ABS (anti-lock brake system) may be provided therebetween.

The invention claimed is:

1. A brake device for a vehicle capable of regenerative braking and fluid pressure braking, including an electric brake-fluid-pressure generator for generating a brake fluid pressure for the fluid pressure braking, wherein:
   the brake device comprises control means for switching from the regenerative braking to the fluid pressure braking, and
   before switching from the regenerative braking to the fluid pressure braking is performed, when a vehicle speed decreases below a switching-preparation-start vehicle speed, the electric brake-fluid-pressure generator is caused to operate to move from a first position to a second position in order to cancel out an ineffective stroke in the fluid pressure braking, said ineffective stroke being a stroke that generates no effective brake fluid pressure in the electric brake-fluid-pressure generator even by operation of the electric brake-fluid-pressure generator, the electric brake-fluid-pressure generator is caused to remain in the second position until the vehicle speed decreases below a switching-start vehicle speed which is lower than the switching-preparation-start vehicle speed
   and then the control means performs the switching from the regenerative braking to the fluid pressure braking.

2. The brake device for a vehicle according to claim 1, wherein
   the brake device is configured to perform only regenerative braking in an initial stage of a regenerative cooperative control, and
   when it is detected that regenerative braking is being performed, the electric brake-fluid-pressure generator is switched from a non-operating state to an operating state to generate a fluid pressure, thereby canceling out the ineffective stroke.

3. The brake device for a vehicle according to claim 1, wherein the electric brake-fluid-pressure generator cancels out the ineffective stroke by supplying a constant current to an electric motor.

4. The brake device for a vehicle according to claim 1, wherein the electric brake-fluid-pressure generator cancels out the ineffective stroke by gradually increasing a current supplied to an electric motor until an operation amount of the electric motor reaches a predetermined operation amount value.

5. The brake device for a vehicle according to claim 4, wherein the electric brake-fluid-pressure generator determines an operation amount of the electric motor necessary to cancel out the ineffective stroke, said operation amount corresponding to the second position of the electric brake-fluid-pressure generator, on the basis of variation of a brake fluid pressure in association with an operation of the electric motor.

6. The brake device for a vehicle according to claim 2, wherein the electric brake-fluid-pressure generator cancels out the ineffective stroke by supplying a constant current to an electric motor.

7. The brake device for a vehicle according to claim 2, wherein the electric brake-fluid-pressure generator cancels out the ineffective stroke by gradually increasing a current supplied to an electric motor until an operation amount of the electric motor reaches a predetermined value.

8. The brake device for a vehicle according to claim 7, wherein the electric brake-fluid-pressure generator determines an operation amount of the electric motor necessary to cancel out the ineffective stroke, said operation amount corresponding to the second position of the electric brake-fluid-pressure generator, on the basis of variation of a brake fluid pressure in association with an operation of the electric motor.

9. The brake device according to claim 1, wherein, when the electric brake-fluid-pressure generator is operating, a rate of change of brake fluid pressure is higher in the second position than in the first position and the second position corresponds to a rate of change of brake fluid pressure that is equal to a predetermined value for canceling an ineffective stroke.

10. The brake device according to claim 1, further comprising an electric motor for driving the electric brake-fluid-pressure generator and a rotation angle sensor for detecting a rotation angle of the electric motor, and wherein the second position is determined based on a rotation angle of the electric motor corresponding to an ineffective stroke.

11. A brake device for a vehicle capable of regenerative braking and fluid pressure braking, including an electric brake-fluid-pressure generator for generating a brake fluid pressure for the fluid pressure braking,
   wherein:
   the brake device comprises control means for switching from the regenerative braking to the fluid pressure braking, and
   before switching from the regenerative braking to the fluid pressure braking is performed, when a vehicle speed decreases below a switching-preparation-start vehicle speed, the electric brake-fluid-pressure generator is caused to operate to increase the brake fluid pressure from a first pressure level to a second higher pressure level, in order to cancel out an ineffective stroke in the fluid pressure braking, said ineffective stroke being a stroke that generates no effective brake fluid pressure in the electric brake-fluid-pressure generator even by operation of the electric brake-fluid-pressure generator, the brake fluid pressure is caused to remain at the second level until the vehicle speed decreases below a switching-start vehicle speed which is lower than the switching-preparation-start vehicle speed
   and then the control means performs the switching from the regenerative braking to the fluid pressure braking.

12. The brake device for a vehicle according to claim 11, wherein
   the brake device is configured to perform only regenerative braking in an initial stage of a regenerative cooperative control, and
   when it is detected that regenerative braking is being performed, the electric brake-fluid-pressure generator is switched from a non-operating state to an operating state to increase the fluid pressure, thereby canceling out the ineffective stroke.

13. The brake device for a vehicle according to claim 11, wherein the electric brake-fluid-pressure generator cancels out the ineffective stroke by gradually increasing a current supplied to an electric motor until an operation amount of the electric motor reaches a predetermined operational amount value.

14. The brake device for a vehicle according to claim 13, wherein the electric brake-fluid-pressure generator determines an operation amount of the electric motor necessary to cancel out the ineffective stroke, corresponding to the second pressure level, on the basis of variation of a brake fluid pressure in association with an operation of the electric motor.

* * * * *